US009170641B2

(12) United States Patent
Huang (10) Patent No.: US 9,170,641 B2
(45) Date of Patent: Oct. 27, 2015

(54) ELECTRONIC DEVICE AND METHOD FOR SUPPLYING POWER TO AT LEAST TWO DIFFERENT LOADS BY SINGLE POWER SUPPLY (71) Applicant: Huawei Device Co., Ltd., Shenzhen (CN)

(72) Inventor: Huiyang Huang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 273 days.

(21) Appl. No.: 13/894,714

(22) Filed: May 15, 2013

(65) Prior Publication Data

US 2013/0254577 A1   Sep. 26, 2013

Related U.S. Application Data (63) Continuation of application No. PCT/CN2012/077118, filed on Jun. 19, 2012.

(30) Foreign Application Priority Data

Jun. 27, 2011  (CN) .......................... 2011 1 0175432

(51) Int. Cl.
G06F 1/32       (2006.01)
G06F 1/26       (2006.01)
H02J 7/34       (2006.01)

(52) U.S. Cl.
CPC .............. G06F 1/3287 (2013.01); G06F 1/266 (2013.01); H02J 7/345 (2013.01); Y02B 60/1282 (2013.01)

(58) Field of Classification Search
CPC ................................ G06F 1/3287; H02J 1/06
See application file for complete search history.

(56) References Cited

U.S. PATENT DOCUMENTS 6,075,295 A    6/2000  Li
6,355,990 B1   3/2002  Mitchell
(Continued)

FOREIGN PATENT DOCUMENTS

CN    101227144 A    7/2008
CN    101499675 A    8/2009
(Continued)

OTHER PUBLICATIONS

Search Report issued in corresponding Chinese Patent Application No. 2011101754322, dated Jan. 24, 2013, 2 pages.
(Continued)

*Primary Examiner* — Paul Yanchus, III
*Assistant Examiner* — Joshua Neveln
(74) *Attorney, Agent, or Firm* — Brinks Gilson & Lione (57) ABSTRACT An electronic device and a method for supplying power are provided. The electronic device includes a power supply, a central processing module, at least two load power supply circuits including a capacitor, at least one switch and at least one feedback resistor unit. The switch is connected with the power supply and the central processing module, configured to be turned on or off according to a control signal output by the central processing module; the feedback resistor unit is connected with the switch and a load, configured to sample the load when the switch is turned on and feed back a sampled voltage, to the power supply through the switch, the power supply supplies power to the load; the capacitor is connected with the switch and the load, configured to be charged when the switch is turned on, or supply power to the load when the switch is turned off.

8 Claims, 7 Drawing Sheets

(56) References Cited

U.S. PATENT DOCUMENTS

| | | |
|---|---|---|
| 2002/0093315 A1 | 7/2002 | Sluijs |
| 2005/0285575 A1* | 12/2005 | Kim et al. ..................... 323/234 |
| 2006/0176031 A1 | 8/2006 | Forman et al. |
| 2008/0174179 A1 | 7/2008 | Hirahara et al. |
| 2010/0148580 A1 | 6/2010 | Taniuchi |

FOREIGN PATENT DOCUMENTS

| | | |
|---|---|---|
| CN | 101685963 A | 3/2010 |
| CN | 101752900 A | 6/2010 |
| CN | 201797338 U | 4/2011 |
| CN | 201854059 U | 6/2011 |
| CN | 102255395 A | 11/2011 |
| EP | 1860922 A1 | 11/2007 |
| JP | 06335251 A | 12/1994 |
| JP | 2002153051 A | 5/2002 |
| JP | 2005080376 A | 3/2005 |

OTHER PUBLICATIONS

International Search Report issued in corresponding PCT Patent Application No. PCT/CN/2012/077118, mailed Sep. 20, 2012, 21 pages.

* cited by examiner

FIG. 8

ELECTRONIC DEVICE AND METHOD FOR SUPPLYING POWER TO AT LEAST TWO DIFFERENT LOADS BY SINGLE POWER SUPPLY

CROSS-REFERENCE TO RELATED APPLICATIONS

This application is a continuation of International Application No. PCT/CN2012/077118, filed on Jun. 19, 2012, which claims priority to Chinese Patent Application No. 201110175432.2, filed on Jun. 27, 2011, both of which are hereby incorporated by reference in their entireties.

FIELD

Embodiments of the present disclosure relate to power supply technologies, and in particular, to an electronic device and a method for supplying power to at least two different loads by a single power supply.

BACKGROUND

At present, because platform manufactures are concerned about the cost, most chip platforms are not integrated with enough power supplies, and accordingly a chip provides only a small number of power supply interfaces. In addition, if an electronic product has too many peripherals, the power supply interfaces provided by the chip may also be insufficient.

In order to solve the problem that the power supply interfaces provided by the chip are insufficient, a direct power supply multiplexing scheme is mainly adopted in the prior art, which is to use a power supply for several peripherals (which are equivalent to loads) at the same time, has advantages of simple circuit and reduced cost, and is conducive to manufacturing small-volume electronic products that are easily carried and moved by users.

However, the direct power supply multiplexing scheme needs the peripherals to have the same working voltage in order to work at the same time. In addition, if one peripheral does not work, the supply of power to the peripheral cannot be cut off, thereby resulting in a waste of power.

SUMMARY

Embodiments of the present disclosure provide an electronic device and a method for supplying power to at least two different loads by a single power supply, so as to solve the defect in the prior art that power supply multiplexing needs loads to have the same voltage and one load cannot be turned off separately, thereby supplying power to multiple different loads by one power supply, and effectively reducing power consumption.

An embodiment of the present disclosure provides an electronic device, including a power supply and a central processing module, and further including: at least two load power supply circuits, where the load power supply circuit includes a capacitor unit, at least one switch, and at least one feedback resistor unit; the switch is respectively connected with the power supply and the central processing module, and configured to be turned on or off according to a control signal output by the central processing module; the feedback resistor unit is connected with the switch and a load, and configured to sample the load when the switch is turned on, and feed back a sampled voltage, which is obtained through sampling, to the power supply through the switch, so that the power supply supplies power to the load according to the sampled voltage; and the capacitor unit is connected with the switch and the load, and configured to be charged when the switch is turned on, or supply power to the load when the switch is turned off.

An embodiment of the present disclosure provides a method for supplying power to at least two different loads by a single power supply, including: receiving, by a load power supply circuit, a control signal output by a central processing module; and selecting, by the load power supply circuit according to the control signal, a power supply or a capacitor unit in the load power supply circuit to supply power to a load.

In the electronic device and the method for supplying power to at least two different loads by a single power supply according to the embodiments of the present disclosure, at least two load power supply circuits are disposed in the electronic device, and the load power supply circuit includes a capacitor unit, at least one switch, and at least one feedback resistor unit. When the switch is turned on according to a turn-on control signal output by a central processing module, the feedback resistor unit samples a load, and sends a sampled voltage obtained through sampling to a power supply, so that the power supply supplies power to the load according to the sampled voltage. When the switch is turned off according to a turn-off control signal output by the central processing module, the capacitor unit supplies power to the load. Therefore, the power supply or the capacitor unit in the load power supply circuit may supply power to the load, which solves the defect in the prior art that power supply multiplexing needs loads to have the same voltage and one load cannot be turned off separately, thereby supplying power to multiple different loads by one power supply, and effectively reducing power consumption.

BRIEF DESCRIPTION OF THE DRAWINGS

To describe the solutions in the embodiments of the present disclosure more clearly, the following briefly introduces the accompanying drawings needed for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, solutions, and advantages of the embodiments of the present disclosure more comprehensible, the following clearly and describes the solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
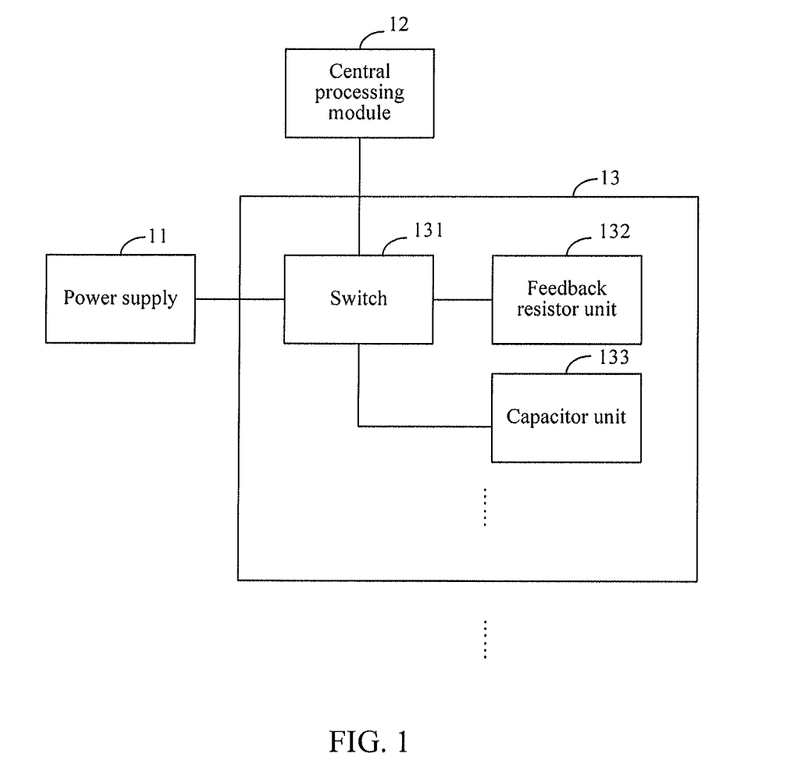
FIG. 1 is a schematic structural diagram of an embodiment of an electronic device in the present disclosure.

FIG. 1 is a schematic structural diagram of an embodiment of an electronic device in the present disclosure. As shown in FIG. 1, an electronic device in this embodiment includes: a power supply 11, a central processing module 12, and at least two load power supply circuits 13, where the load power supply circuit 13 includes at least one switch 131, at least one feedback resistor unit 132, and a capacitor unit 133.

Specifically, the switch 131 is connected with the power supply 11 and the central processing module 12 respectively, and configured to be turned on or off according to a control signal output by the central processing module 12. The feedback resistor unit 132 is connected with the switch 131 and a load, and configured to sample the load when the switch 131 is turned on, and feed back a sampled voltage, which is obtained through sampling, to the power supply 11 through the switch 131, so that the power supply 11 supplies power to the load according to the sampled voltage. The capacitor unit 133 is connected with the switch 131 and the load, and configured to be charged when the switch 131 is turned on, or supply power to the load when the switch 131 is turned off.

Specifically, the control signal may be a turn-on signal or a turn-off signal. The central processing module 12 may specifically be a central processing unit (Central Processing Unit; CPU for short). The power supply 11 may be a low dropout regulator (Low Dropout Regulator; LDO for short) or a direct current to direct current (DC/DC) converter. The feedback resistor unit 132 may include a resistor and a capacitor unit, where the resistance of the resistor is related to the working voltage of the load connected with the feedback resistor unit 132.

In this embodiment, at least two load power supply circuits are disposed in the electronic device, and the load power supply circuit includes at least one switch, at least one feedback resistor unit, and a capacitor unit. When the switch is turned on according to a control signal output by a central processing module, the feedback resistor unit is triggered to sample the load, and send a sampled voltage obtained through sampling to a power supply, so that the power supply supplies power to the load according to the sampled voltage. When the switch is turned off according to a control signal output by the central processing module, the capacitor unit supplies power to the load. When one load is powered by the power supply, another load may be powered by the capacitor unit connected therewith; therefore, the power supply may supply power to multiple loads, which solves the defect in the prior art that power supply multiplexing needs loads to have the same voltage and one load cannot be turned off separately, thereby effectively reducing power consumption.

It should be noted that, a discharge current of the capacitor unit is greater than a current needed for normal working of the load. Specifically, a current of a capacitor in the capacitor unit may be calculated by using a formula such as a differential formula $I = Cd(u)/d(t)$, where I represents the current of the capacitor; Cd(u) represents a change in voltage of the capacitor; and d(t) represents a change in time. For example, assuming that the power supply switching frequency of the load is 100 K, the capacitance of C194 and C191 is 10 µf, and a voltage ripple is 0.2 V, $I = 10 \mu f * 0.2V/(1/100K) = 200$ mA, and accordingly when a load below 50 mA is used, it may be ensured that when the power supply does not supply power to the load, the capacitor can continuously supply power to the load. In addition, in actual application, the switching frequency may be increased and the capacitance before the load may be increased, so that power may be continuously supplied to the load better. The increasing the continuous capacitance before the load is increasing the number of capacitors in the capacitor unit, or increasing the capacity of the capacitors in the capacitor unit without increasing the number of capacitors.

Figure 2:
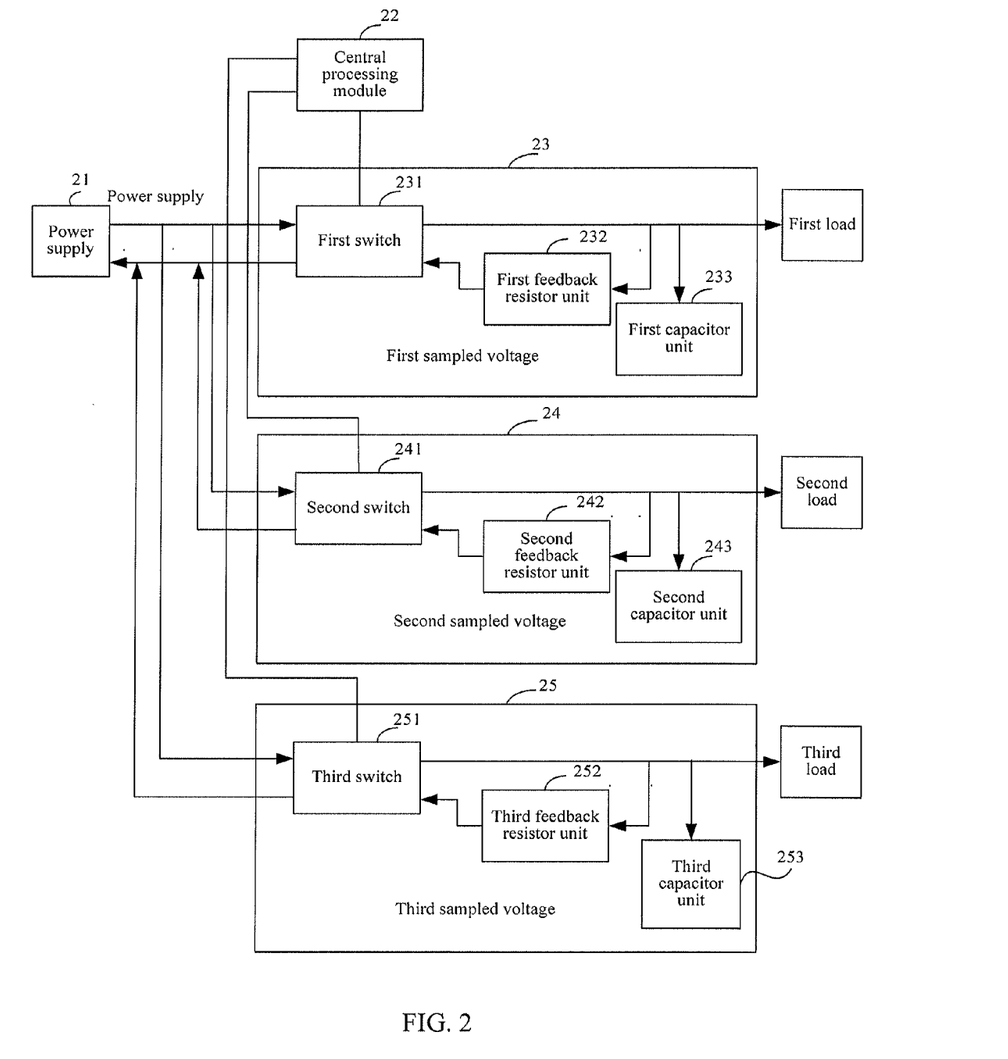
FIG. 2 is a schematic structural diagram of another embodiment of an electronic device in the present disclosure.

FIG. 2 is a schematic structural diagram of another embodiment of an electronic device in the present disclosure. As shown in FIG. 2, in this embodiment, an example where one power supply needs to supply power to three loads (the three loads may be the same or different) is taken to illustrate in detail the solution in this embodiment. As shown in FIG. 2, the electronic device includes a power supply 21, a central processing module 22, and three load power supply circuits, namely, a first load power supply circuit 23, a second load power supply circuit 24, and a third load power supply circuit 25.

The first load power supply circuit 23 includes a first switch 231, a first feedback resistor unit 232, and a first capacitor unit 233. The second load power supply circuit 24 includes a second switch 241, a second feedback resistor unit 242, and a second capacitor unit 243. The third load power supply circuit 25 includes a third switch 251, a third feedback resistor unit 252, and a third capacitor unit 253.

Specifically, the central processing module 22 is connected with the first switch 231, the second switch 241, and the third switch 251 respectively. The first switch 231, the first feedback resistor unit 232, and the first capacitor unit 233 are connected with a first load respectively. The second switch 241, the second feedback resistor unit 242, and the second capacitor unit 243 are connected with a second load respectively. The third switch 251, the third feedback resistor unit 252, and the third capacitor unit 253 are connected with a third load respectively. It should be noted that, when the three loads are the same, the first feedback resistor unit 232, the second feedback resistor unit 242, and the third feedback resistor unit 252 may be set to have the same resistance; and when the three loads are different, the first feedback resistor unit 232, the second feedback resistor unit 242, and the third feedback resistor unit 252 may be set to have different resistances.

In this embodiment, when the central processing module 22 outputs a turn-on control signal to the first switch 231, and outputs a turn-off control signal to the second switch 241 and the third switch 251 respectively, that is, when the central processing module 22 controls the first switch 231 to be turned on, and controls the second switch 241 and the third switch 251 to be turned off, the first feedback resistor unit 232 samples the first load, and feeds back a first sampled voltage, which is obtained through sampling, to the power supply 21 through the first switch 231, so as to notify the power supply 21 of how much voltage is needed by the first load, and to trigger the power supply 21 to output, according to the first sampled voltage, power to the first switch 231, and the first switch 231 outputs the power to the first load, thereby supplying power to the first load. At the same time, the first switch 231 also outputs the power to the first capacitor unit 233, so as to charge the first capacitor unit 233. In addition, the second capacitor unit 243 supplies power to the second load; and the third capacitor unit 253 supplies power to the third load.

When the central processing module 22 outputs a turn-on control signal to the second switch 241, and outputs a turn-off control signal to the first switch 231 and the third switch 251 respectively, that is, when the central processing module 22 controls the second switch 241 to be turned on, and controls the first switch 231 and the third switch 251 to be turned off, the second feedback resistor unit 242 samples the second load, and feeds back a second sampled voltage, which is obtained through sampling, to the power supply 21 through the second switch 241, so as to notify the power supply 21 of how much voltage is needed by the second load, and to trigger the power supply 21 to output, according to the second sampled voltage, power to the second switch 241, and the second switch 241 outputs the power to the second load, thereby supplying power to the second load. At the same time, the second switch 241 also outputs the power to the second capacitor unit 243, so as to charge the second capacitor unit 243. In addition, the first capacitor unit 233 supplies power to the first load; and the third capacitor unit 253 supplies power to the third load. It should also be noted that, when the first load and the second load are the same, that is, the working voltages are the same, the second sampled voltage fed back by the second switch 241 to the power supply 21 may be the same as the first sampled voltage fed back by the first switch 231 to the power supply 21; and when the first load and the second load are different, that is, the working voltages are different, the second sampled voltage fed back by the second switch 241 to the power supply 21 may be different from the first sampled voltage fed back by the first switch 231 to the power supply 21.

When the central processing module 22 outputs a turn-on control signal to the third switch 251, and outputs a turn-off control signal to the first switch 231 and the second switch 241 respectively, that is, when the central processing module 22 controls the third switch 251 to be turned on, and controls the first switch 231 and the second switch 241 to be turned off, the third feedback resistor unit 252 samples the third load, and feeds back a third sampled voltage, which is obtained through sampling, to the power supply 21 through the third switch 251, so as to notify the power supply 21 of how much voltage is needed by the third load, and to trigger the power supply 21 to output, according to the third sampled voltage, power to the third switch 251, and the third switch 251 outputs the power to the third load, thereby supplying power to the third load. At the same time, the third switch 251 also outputs the power to the third capacitor unit 253, so as to charge the third capacitor unit 253. In addition, the first capacitor unit 233 supplies power to the first load; and the second capacitor unit 243 supplies power to the second load. It should also be noted that, when the first load, the second load, and the third load are the same, that is, when the working voltages are the same, the third sampled voltage fed back by the third switch 251 to the power supply 21 may be the same as the second sampled voltage fed back by the second switch 241 to the power supply 21 and the first sampled voltage fed back by the first switch 231 to the power supply 21; and when the first load, the second load, and the third load are different, that is, when the working voltages are different, the third sampled voltage fed back by the third switch 251 to the power supply 21 may be different from the second sampled voltage fed back by the second switch 241 to the power supply 21 or the first sampled voltage fed back by the first switch 231 to the power supply 21.

It should be noted that, for example, when the first load does not work, the central processing module 22 may send a turn-off control signal to the first switch 231, so that the first switch 231 is turned off, and after the first capacitor unit 233 discharges, the first load stops working, thereby effectively reducing power consumption when the first load does not work.

In this embodiment, three load power supply circuit are disposed in the electronic device, and each load power supply circuit includes a switch, a feedback resistor, and a capacitor unit. When the power supply supplies power to the first load, power may be supplied to the second load and the third load through the capacitor units in the other two load power supply circuits. Therefore, the power supply may supply power to different loads. In addition, when the loads does not work, the switch in the corresponding load power supply circuit may be turned off, which solves the defect in the prior art that power supply multiplexing needs loads to have the same voltage and one load cannot be turned off separately, thereby supplying power to multiple different loads by one power supply, and effectively reducing power consumption.

It should be noted that, in the foregoing embodiment, when one load does not work and needs to sleep, a sleep signal is sent to the central processing module, so that the central processing module enables, according to the sleep signal, the switch connected with the load to be maintained off. Because the energy stored by the capacitor unit is limited, the power supplied by the capacitor unit for the load can last for 1 second at most, and therefore, when the energy stored by the capacitor unit is exhausted, the load does not work, and the power supply voltage is zero volts (V). In addition, the capacitor unit does not absorb energy from the power supply when supplying power to the load, thereby effectively reducing power consumption.

Figure 3:
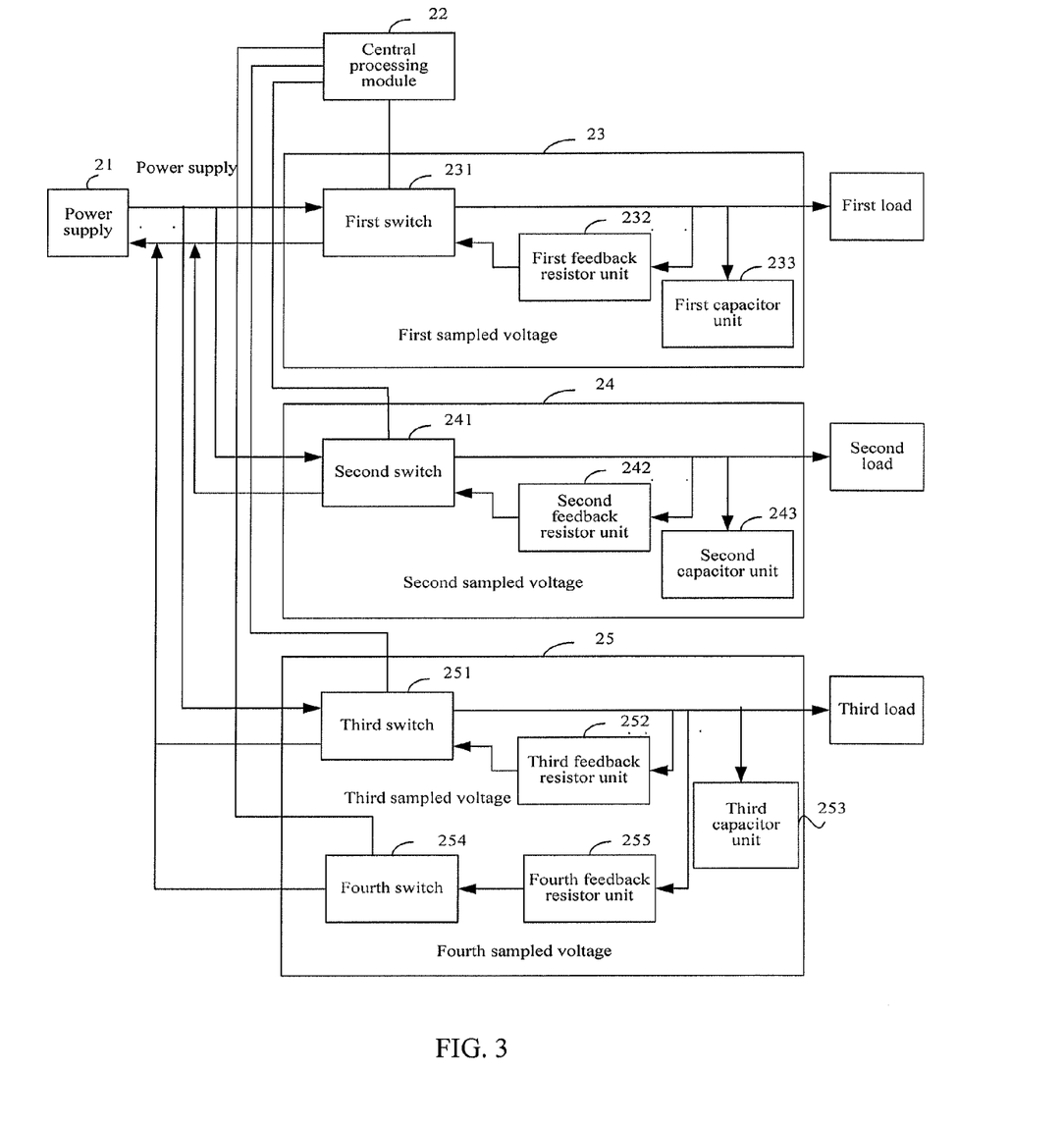
FIG. 3 is a schematic structural diagram of still another embodiment of an electronic device in the present disclosure.

FIG. 3 is a schematic structural diagram of an embodiment of an electronic device in the present disclosure. Based on the embodiment shown in FIG. 2, an example where the third load works at a standby low voltage is taken to illustrate in detail the solution in this embodiment. As shown in FIG. 3, the third load power supply circuit 25 further includes: a fourth switch 254 and a fourth feedback resistor unit 255, where the fourth switch 254 is connected with the power supply 21 and the central processing module 22, and configured to be turned on or off according to a control signal output by the central processing module 22; and the fourth feedback resistor unit 255 is connected with the third load and the fourth switch 254, and configured to sample the third load when the fourth switch 254 is turned on, and feed back a fourth sampled voltage, which is obtained through sampling, to the power supply 21 through the fourth switch 254, so that the power supply 21 supplies power to the third load according to the fourth sampled voltage.

When the third load works at the standby low voltage, the third load outputs a low voltage work signal to the central processing module 22 through the third switch 251. After receiving the low voltage work signal, the central processing module 22 outputs a turn-off control signal to the third switch 251 according to the low voltage work signal. In addition, when a turn-on control signal is output to the fourth switch 254, the fourth feedback resistor unit 255 samples the third load, and feeds back the fourth sampled voltage, which is obtained through sampling, to the power supply 21 through the fourth switch 254, so that the power supply 21 supplies power to the third load according to the fourth sampled voltage. It should be noted that, the third sampled voltage obtained through sampling by the third feedback resistor unit 252 is a normal working voltage (for example, 2 V) of the third load, and the fourth sampled voltage obtained through sampling by the fourth feedback resistor unit 255 is a low power consumption voltage (for example, 1.2 V) of the third load.

It should be noted that, each load power supply circuit may include at least one switch and at least one feedback resistor unit, so that the voltage of each load may be selected from multiple power supply voltages.

In this embodiment, three load power supply circuits are disposed in the electronic device, and each load power supply circuit includes at least one switch, at least one feedback resistor, and a capacitor unit. The switch in each load power supply circuit is turned on or off in turn, and when the switch is turned on according to a turn-on control signal output by a central processing module, the feedback resistor unit samples a load, and sends a sampled voltage obtained through sampling to a power supply, so that the power supply supplies power to the load according to the sampled voltage; and when the switch is turned off according to a turn-off control signal output by the central processing module, the capacitor unit supplies power to the load, which solves the defect in the prior art that power supply multiplexing needs loads to have the same voltage and one load cannot be turned off separately, thereby supplying power to multiple different loads by one power supply, and effectively reducing power consumption. In addition, multiple switches and feedback resistor units may be disposed in each load power supply circuit, so that different power supply voltages may be selected according to different needs of the load, thereby effectively achieving flexibility in supplying power to the load.

Figure 4:
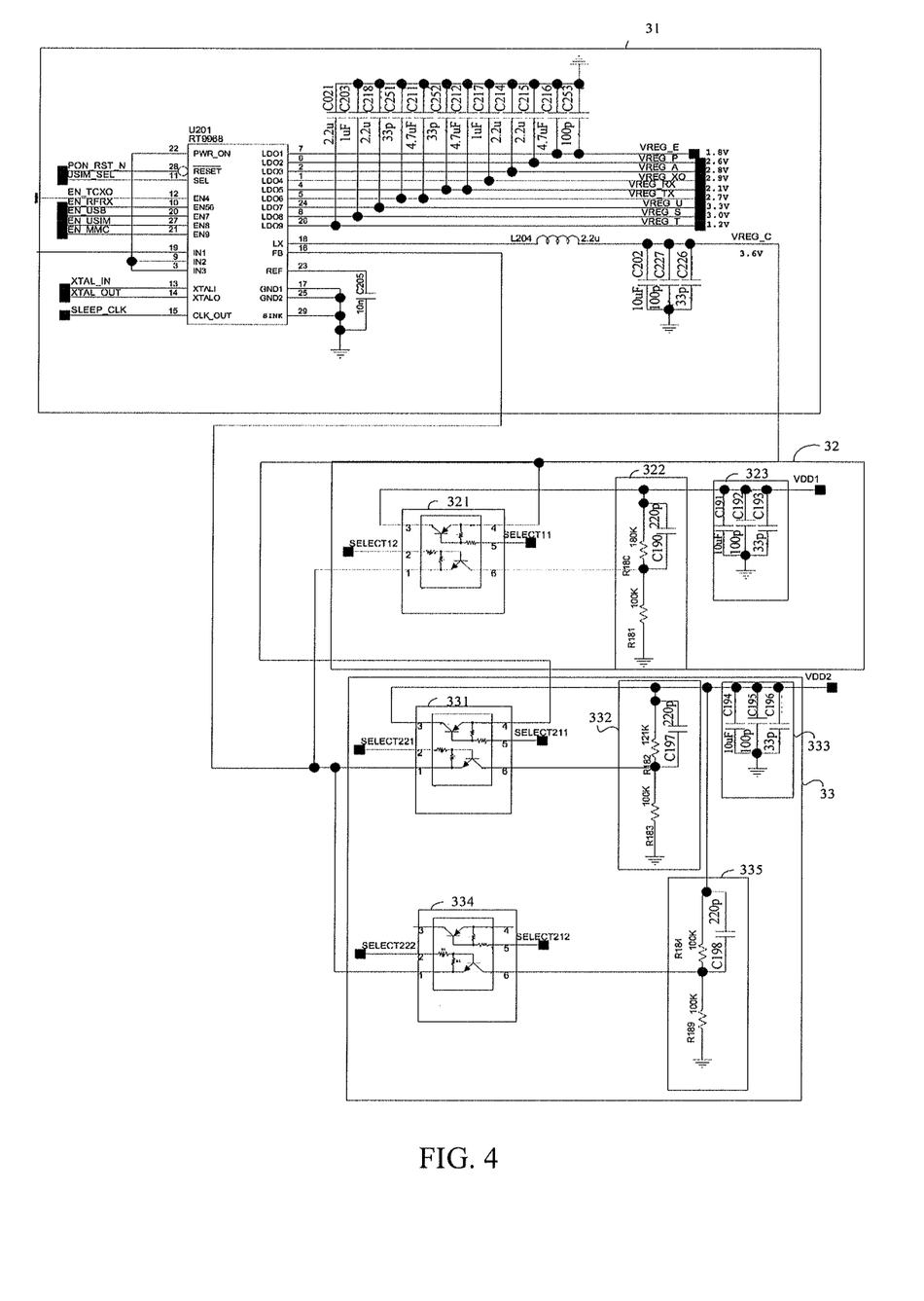
FIG. 4 is a schematic circuit diagram of yet another embodiment of an electronic device in the present disclosure.
Figure 5:
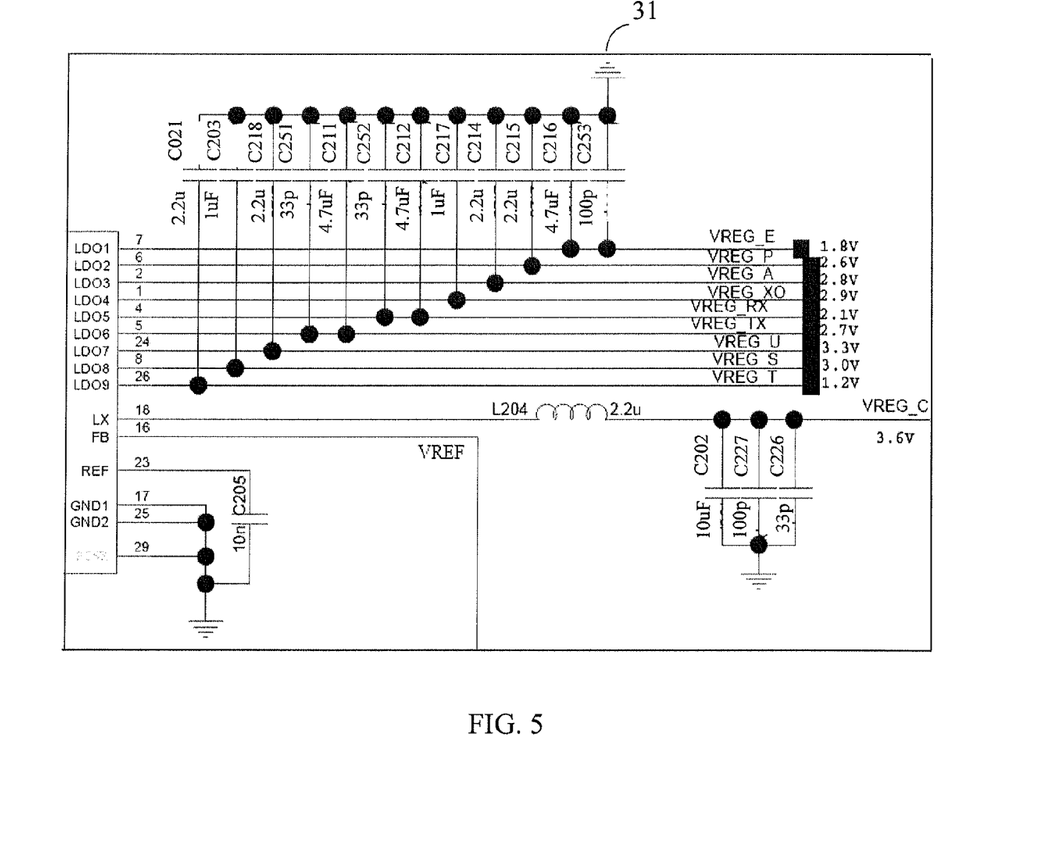
FIG. 5 is a partial schematic circuit diagram of a power supply 31 in the electronic device shown in FIG. 4.
Figure 6:
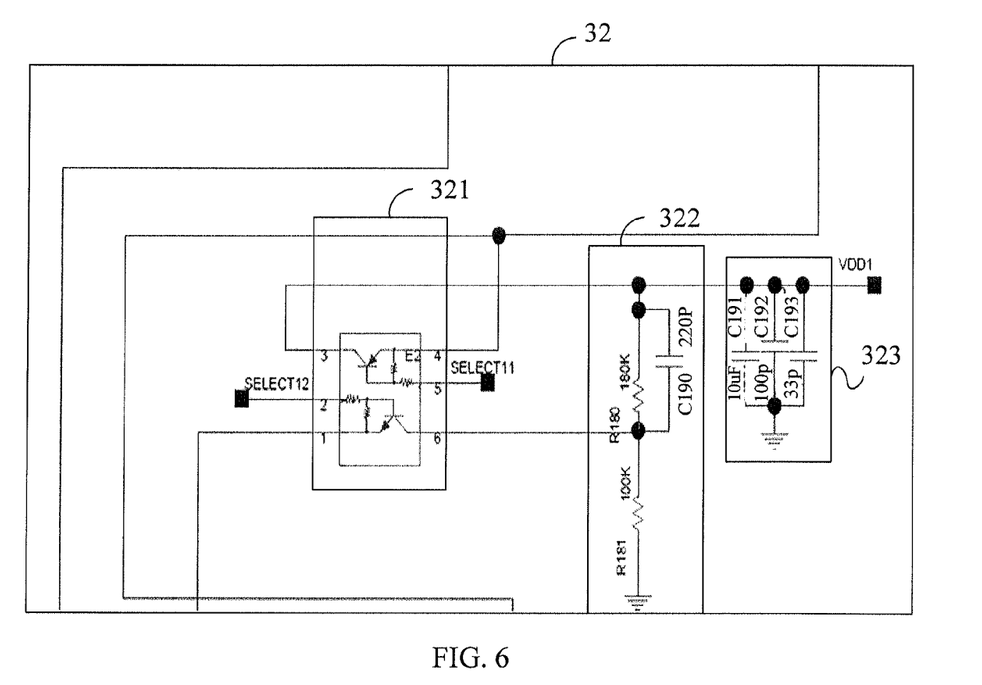
FIG. 6 is a schematic circuit diagram of a first load power supply circuit 32 in the electronic device shown in FIG. 4.
Figure 7:
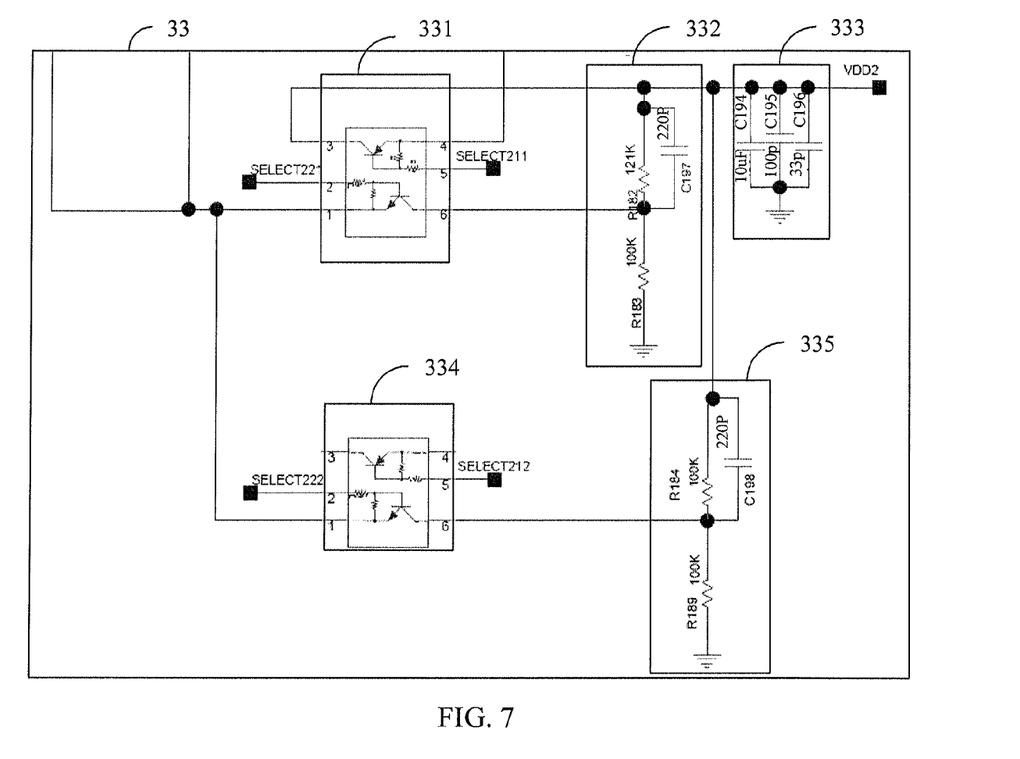
FIG. 7 is a schematic circuit diagram of a second load power supply circuit 33 in the electronic device shown in FIG. 4.

The electronic device with the foregoing functions according to the present disclosure may be implemented by multiple types of chips in combination with a peripheral circuit, and is preferably implemented as described in an embodiment shown in FIG. 4. In this embodiment, FIG. 4 is a schematic circuit diagram of yet another embodiment of an electronic device in the present disclosure; FIG. 5 is a partial schematic circuit diagram of a power supply 31 in the electronic device shown in FIG. 4; FIG. 6 is a schematic circuit diagram of a first load power supply circuit 32 in the electronic device shown in FIG. 4; and FIG. 7 is a schematic circuit diagram of a second load power supply circuit 33 in the electronic device shown in FIG. 4. Refer to FIG. 4 to FIG. 7.

The electronic device includes: a power supply 31, a first load power supply circuit 32 and a second load power supply circuit 33. The first load power supply circuit 32 includes: a first switch 321, a first feedback resistor unit 322, and a first capacitor unit 323. The second load power supply circuit 33 includes: a second switch 331, a second feedback resistor unit 332, a second capacitor unit 333, a third switch 334, and a third feedback resistor unit 335.

Specifically, the first switch 321 has a dual-transistor structure, including two transistors and two resistors, where a pin 1 of the first switch 321 is connected with a pin 1 of the second switch 331, a pin 2 of the first switch 321 is connected with SELECT 12 of a central processing module (not drawn), a pin 5 of the first switch 321 is connected with SELECT11 of the central processing module, a pin 4 of the first switch 321 is configured to receive power VREG_C output by the power supply 31, a pin 3 of the first switch 321 is configured to output a power supply VDD1, and a pin 6 of the first switch 321 is connected with the first feedback resistor unit 322. The first feedback resistor unit 322 includes a resistor R181, a resistor R180, and a capacitor C190, where the resistor R180 is connected in parallel with the capacitor C190. One end of each of the resistor R180 and the capacitor C190 is connected with the pin 3 of the first switch 321, the other end of each of the resistor R180 and the capacitor C190 is connected with one end of the resistor R181, and the other end of the resistor R181 is connected with the ground. The first capacitor unit 323 includes three capacitors, namely, a capacitor C191, a capacitor C192, and a capacitor C193. The capacitor C191, the capacitor C192, and the capacitor C193 are connected in parallel. One end of each of the capacitor C191, the capacitor C192, and the capacitor C193 is connected with the ground. The other end of each of the capacitor C191, the capacitor C192, and the capacitor C193 is connected with the pin 3 of the first switch 321. In addition, the capacitor C191 is configured to supply power to a load; and the capacitor C192 and the capacitor C193 are configured to filter out a ripple.

The second switch 331 has a dual-transistor structure, including two transistors and two resistors, where the pin 1 of the second switch 331 is connected with the pin 1 of the first switch 321 and the third switch 334 respectively, a pin 2 of the second switch 331 is connected with SELECT221 of the central processing module, a pin 5 of the second switch 331 is connected with SELECT211 of the central processing module, a pin 4 of the second switch 331 is configured to receive the power VREG_C output by the power supply 31, a pin 3 of the second switch 331 is configured to output a power supply VDD2, and a pin 6 of the second switch 331 is connected with the second feedback resistor unit 332. The second feedback resistor unit 332 includes a resistor R183, a resistor R182, and a capacitor C197, where the resistor R182 and the capacitor C197 are connected in parallel. One end of each of the resistor R182 and the capacitor C197 is connected with the pin 3 of the second switch 331 respectively, the other end of each of the resistor R182 and the capacitor C197 is connected with one end of the resistor R183, and the other end of the resistor R183 is connected with the ground. The second capacitor unit 333 includes three capacitors, namely, a capacitor C194, a capacitor C195, and a capacitor C196, where one end of each of the capacitor C194, the capacitor C195, and the capacitor C196 is connected with the ground, and the other end of each of the capacitor C194, the capacitor C195, and the capacitor C196 is connected with the pin 3 of the second switch 331. In addition, the capacitor C194 is configured to supply power to a load; and the capacitor C195 and the capacitor C196 are configured to filter out a ripple.

The third switch 334 has a dual-transistor structure, including two transistors and two resistors, where a pin 1 of the third switch 334 is connected with the pin 1 of the second switch 331, a pin 2 of the third switch 334 is connected with SELECT 222 of the central processing module, a pin 5 of the third switch 334 is connected with SELECT212 of the central processing module, and a pin 6 of the third switch 334 is connected with the third feedback resistor unit 335. The third feedback resistor unit includes a resistor R189, a resistor R184, and a capacitor C198, where the resistor R184 and the capacitor C198 are connected in parallel. One end of each of the resistor R184 and the capacitor C198 is connected with the pin 3 of the second switch 331, the other end of each of the resistor R184 and the capacitor C198 is connected with one end of the resistor R189, and the other end of the resistor R189 is connected with the ground.

When the power supply 31 supplies power to the load connected with the first switch 321, the central processing module controls a SELECT12 signal to be low, so as to enable the first switch 321 to enter a saturated conduction, so that the resistor R180 and the resistor R181 in the first feedback resistor unit 322 sample the load, specifically, obtain a first sampled voltage VREG_C by using a formula VREG_C=VREF*R181/(R181+R180), and feed back the first sampled voltage VREG_C to an FB pin of the power supply 31. Accordingly the power supply 31 outputs, according to the first sampled voltage VREG_C, the power VREG_C to the pin 4 of the first switch 321. In addition, the central processing module controls a SELECT11 signal to be low, so as to enable the first switch 321 to enter a saturated conduction, so that the pin 4 of the first switch 321 receives the power VREG_C output by the power supply 31, and the power supply VDD1 is output through the pin 3 of the first switch 321. At the same time, the second switch 331 and the third switch 334 are off, and the C194 supplies power to the load connected with the first switch 321. Here, VREF is a constant value. It should be noted that, the voltage of the load is related to values of the resistor R181 and the resistor R180.

When the power supply 31 supplies power to the load connected with the second switch 331 to enable the load to work normally, the central processing module controls a SELECT221 signal to be low, so as to enable the second switch 331 to enter a saturated conduction, so that the resistor R183 and the resistor R182 in the second feedback resistor unit 332 sample the load, that is, obtain a second sampled voltage VREG_C by using a formula VREG_C=VREF*R183/(R183+R182), and feed back the second sampled voltage feedback VREG_C to the FB pin of the power supply 31 (the voltage of the FB pin is VREF). Accordingly the power supply 31 outputs, according to the second sampled voltage VREG_C, the power supply VREG_C to the pin 4 of the second switch 331. In addition, the central processing module controls a SELECT211 signal to be low, so as to enable the second switch 331 to enter a saturated conduction, so that the pin 4 of the second switch 331 receives the power VREG_C output by the power supply 31, and the power supply VDD2 is output through the pin 3 of the second switch 331. At the same time, the first switch 321 and the third switch 334 are off, and the C191 supplies power to the load connected with the first switch 331.

When the load connected with the second switch 331 works at a standby low voltage, the load sends a low voltage work signal to the central processing module through the second switch 331. The central processing module controls a SELECT222 signal to be low, so as to enable the third switch 334 to enter a saturated conduction, so that the resistor R189 and the resistor R184 in the third feedback resistor unit 335 sample the load, that is, obtain a third sampled voltage VREG_C by using a formula VREG_C=VREF*R189/(R189+R184), and feed back the third sampled voltage VREG_C to the FB pin of the power supply 31. Accordingly, the power supply 31 outputs, according to the third sampled voltage, the obtained VREG_C to the pin 4 of the second switch 331. In addition, because the central processing module controls the SELECT211 signal to be low, transistors having the pin 3, the pin 4 and the pin 5 in the second switch 331 are on, and transistors having the pin 1, the pin 2 and the pin 6 in the second switch 331 are off. Therefore, the pin 4 of the second switch 331 receives the power VREG_C output by the power supply 31, and the power supply VDD2 is output through the pin 3 of the second switch 331, where the power supply VDD2 is a low voltage. At the same time, the first switch 321 is off, and the C191 supplies power to the load connected with the first switch 321.

It should also be noted that, when the load connected with the second switch 331 does not work and needs to sleep, and the power supply 31 supplies power to the load connected with the first switch 321, the capacitor C194 supplies power to the load connected with the second switch 331. The capacitor C194 supplies power for a short period of time, for example, less than about 0.2 second, and therefore, after 0.2 second, the capacitor C194 completes discharging and may no longer supply power to the load connected with the second switch 331.

Further, in the foregoing embodiment, in order to ensure that when the power supply does not supply power to the load, the capacitor can continuously supply power to the load, a discharge current of the capacitor should be greater than a current needed for normal working of the load. Specifically, a current of the capacitor in the capacitor unit may be calculated by using a formula such as a differential formula $I=Cd(u)/d(t)$, where I represents the current of the capacitor; Cd(u) represents a change in voltage of the capacitor; and d(t) represents a change in time. For example, assuming that the power supply switching frequency of the load is 100 K, the capacitance of C194 and C191 is 10 μf, and a voltage ripple is 0.2 V, I=10 μf*0.2V/(1/100K)=200 ma, and accordingly when a load below 50 ma is used, it may be ensured that when the power supply does not supply power to the load, the capacitor can continuously supply power to the load. In addition, in actual application, the switching frequency may be increased and the continuous capacitance before the load may be increased, so that power can be continuously supplied to the load better. The increasing the continuous capacitance before the load is increasing the number of capacitors in the capacitor unit, or increasing the capacity of the capacitors in the capacitor unit without increasing the number of capacitors.

Figure 8:
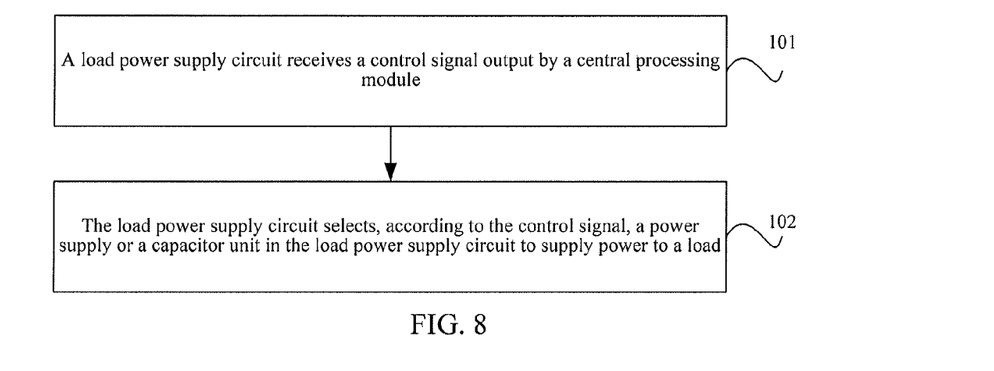
FIG. 8 is a flowchart of an embodiment of a method for supplying power to at least two different loads by a single power supply in the present disclosure.

FIG. 8 is a flowchart of an embodiment of a method for supplying power to at least two different loads by a single power supply in the present disclosure. As shown in FIG. 8, the method in this embodiment includes:

Step 101: A load power supply circuit receives a control signal output by a central processing module.

In this embodiment, the load power supply circuit may be the load power supply circuit in the embodiments shown in FIG. 1 to FIG. 4. The control signal may be a turn-on control signal or a turn-off control signal.

Step 102: The load power supply circuit selects, according to the control signal, a power supply or a capacitor unit in the load power supply circuit to supply power to a load.

In this embodiment, the load power supply circuit receives a control signal output by a central processing module, and selects, according to the control signal, a power supply or a capacitor unit in the load power supply circuit to supply power to a load, so as to solve the defect in the prior art that power supply multiplexing needs loads to have the same voltage and one load cannot be turned off separately, thereby supplying power to multiple different loads by one power supply, and effectively reducing power consumption.

Further, in another embodiment of the present disclosure, based on the embodiment shown in FIG. 8, an implementation manner of step 102 is:

when the control signal is a turn-on control signal, sampling, by the load power supply circuit, the load according to the turn-on control signal, and outputting a sampled voltage obtained through sampling to the power supply, so that the power supply outputs power according to the sampled voltage; and receiving, by the load power supply circuit, the power, and outputting the power to the load.

Alternatively, another implementation manner of step 102 is:

when the control signal is a turn-off control signal, selecting, by the load power supply circuit according to the turn-off control signal, the capacitor unit in the power supply load circuit to supply power to the load.

In this embodiment, when the central processing module outputs the turn-on control signal, the load is sampled, and the sampled voltage obtained through sampling is sent to the power supply, so that the power supply supplies power to the load according to the sampled voltage; and when the central processing module outputs the turn-off control signal, the capacitor unit supplies power to the load, which solves the defect in the prior art that power supply multiplexing needs loads to have the same voltage and one load cannot be turned off separately, thereby supplying power to multiple different loads by one power supply, and effectively reducing power consumption.

In the embodiments of the present disclosure, different loads refer to loads with different voltage needs, and loads of the same nature that work in a high voltage state and a low voltage state respectively also belong to different loads described in the embodiments of the present disclosure.

It should be noted that, in the embodiments of the present disclosure, the central processing module needs to control the switch in each load power supply circuit, so that at a same time, the power supply only supplies power to loads with same voltage needs. If different loads exist in the entire circuit, the central processing module turns on and off the switches in the corresponding load power supply circuits in turn, so that the capacitors in the load power supply circuits are charged and discharged alternately, thereby continuously supplying power to the load. In order to ensure continuous supply of power to the load, an off duration of a switch of a load power supply circuit that is turned off by the central processing module should not be greater than a discharging duration of a capacitor that is configured to supply power to the load in the load power supply circuit.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disk.

Finally, it should be noted that the foregoing embodiments are merely intended for describing the solutions of the present disclosure other than limiting the present disclosure. Although the present disclosure is described in detail with reference to the foregoing embodiments, persons of ordinary skill in the art should understand that they may still make modifications to the solution described in the foregoing embodiments or make equivalent replacements to some features thereof; without departing from the scope of the solution of the embodiments of the present disclosure.

What is claimed is:

1. An electronic device, comprising a power supply and a central processing module, and further comprising: at least two load power supply circuits, wherein each load power supply circuit comprises a capacitor unit, at least one switch, and at least one feedback resistor unit;
   each switch is respectively connected with the power supply and the central processing module, and configured to be turned on or off according to a control signal output by the central processing module;
   each feedback resistor unit is connected between a corresponding switch and a load to form a feedback path, wherein each feedback resistor unit is configured to sample the load when the corresponding switch is turned on and directly feed back a sampled voltage of the power supply through the corresponding switch, so that the power supply supplies power to the load according to the sampled voltage; and
   the capacitor unit is connected with each switch of the load power supply unit and the load, and configured to be charged when at least one switch of the load power supply unit is turned on, or supply power to the load when the at least one switch of the load power supply unit is turned off, wherein the load is external to the load power supply circuit and is electrically isolated from the central processing module.

2. The electronic device according to claim 1, wherein a discharge current of the capacitor unit is greater than a current needed for normal working of the load.

3. The electronic device according to claim 2, wherein each switch comprises a transistor switch.

4. The electronic device according to claim 1, wherein the central processing module is further configured to control an off duration of a switch of the at least one switch to be not longer than a discharging duration of the capacitor unit.

5. A method for supplying power to at least two different loads by a single power supply, comprising:
   receiving, by a load power supply circuit, a control signal output by a central processing module; and
   selecting, by the load power supply circuit according to the control signal, the single power supply or a capacitor unit in the load power supply circuit to supply power to a load, wherein the load power supply circuit comprises:
   the capacitor unit, at least one switch, and at least one feedback resistor unit;
   each switch is respectively connected with the power supply and the central processing module, and configured to be turned on or off according to the control signal output by the central processing module;
   each feedback resistor unit is connected between a corresponding switch and a load to form a feedback path, wherein each feedback resistor unit is configured to sample the load when the corresponding switch is turned on and directly feed back a sampled voltage of the power supply through the corresponding switch, so that the power supply supplies power to the load according to the sampled voltage; and
   the capacitor unit is connected with each switch of the load power supply unit and the load, and configured to be charged when at least one switch of the load power supply unit is turned on, or supply power to the load when the at least one switch of the load power supply unit is turned off, wherein the load is external to the load power supply circuit and is electrically isolated from the central processing module.

6. The method according to claim 5, wherein selecting, by the load power supply circuit according to the control signal, a power supply or a capacitor unit in the load power supply circuit to supply power to a load comprises:
   when the control signal is a turn-on control signal, sampling, by the load power supply circuit, the load according to the turn-on control signal, and outputting a sampled voltage obtained through sampling to the power supply, so that the power supply outputs power according to the sampled voltage; and
   receiving, by the load power supply circuit, the power, and outputting the power to the load.

7. The method according to claim 5, wherein selecting, by the load power supply circuit according to the control signal, a power supply or a capacitor unit in the load power supply circuit to supply power to a load comprises:
   when the control signal is a turn-off control signal, selecting, by the load power supply circuit according to the turn-off control signal, the capacitor unit in the power supply load circuit to supply power to the load.

8. The method according to claim 5, wherein an off duration of a switch of the at least one switch of the load power supply circuit is not longer than a discharging duration of the capacitor unit.

* * * * *